United States Patent [19]
Konstantinides et al.

[11] Patent Number: 6,016,366
[45] Date of Patent: Jan. 18, 2000

[54] METHOD OF FILTERING IMAGES USING IMAGE COMPRESSIBILITY TO DETERMINE THRESHOLD PARAMETER

[75] Inventors: Kontantinos Konstantinides, San Jose; Balas K. Natarajan, Los Gatos; Gregory S. Yovanof, Sunnyvale, all of Calif.

[73] Assignee: Hewlett-Packard Company, Palo Alto, Calif.

[21] Appl. No.: 09/056,456

[22] Filed: Apr. 7, 1998

Related U.S. Application Data

[63] Continuation of application No. 08/596,800, Feb. 5, 1996, Pat. No. 5,787,209.

[51] Int. Cl.$^7$ .................................................. H04B 1/66
[52] U.S. Cl. .......................................... 382/260; 382/261
[58] Field of Search ..................... 382/260–261, 382/277, 265, 240

[56] References Cited

U.S. PATENT DOCUMENTS

| | | | |
|---|---|---|---|
| 4,802,110 | 1/1989 | Richards et al. ........................ | 382/260 |
| 5,010,504 | 4/1991 | Lee et al. ................................ | 364/574 |
| 5,400,371 | 3/1995 | Natarajan ................................ | 375/122 |
| 5,561,723 | 10/1996 | DesJardins et al. ..................... | 382/260 |
| 5,787,209 | 7/1998 | Konstantinides et al. .............. | 382/260 |

*Primary Examiner*—Thomas D. Lee
*Assistant Examiner*—Stephen Brinich

[57] ABSTRACT

A method of filtering an image to reduce noise. The image is divided into subimages or "blocks". An optimum value of a threshold parameter is determined by repeatedly applying a Singular Value Decomposition ("SVD") transform to one of the blocks for various values of the threshold parameter and then using a lossless compression algorithm to determine the compressed size of the various transforms. The optimum threshold parameter is determined by finding the maximum of the second derivative of the compressed size with respect to the log of the threshold parameter. The SVD transform is then applied to all the blocks using the optimum value of the threshold parameter, and the transformed blocks are then recombined to provide the filtered image.

14 Claims, 3 Drawing Sheets

METHOD OF FILTERING IMAGES USING IMAGE COMPRESSIBILITY TO DETERMINE THRESHOLD PARAMETER

CROSS REFERENCE TO RELATED APPLICATIONS

This is a continuation of application Ser. No. 08/596,800 filed on Feb. 5, 1996, now U.S. Pat. No. 5,787,209.

FIELD OF THE INVENTION

The present invention relates to image processing systems, and more particularly to an improved method of removing noise from an image by using a Singular Value Decomposition transform.

BACKGROUND OF THE INVENTION

Images captured on film or by electronic devices such as scanners and television cameras are often corrupted with noise. In the case of images captured on film, the noise is introduced by grains in the photographic emulsions. In the case of cameras for use with video recorders, the CCD arrays are known to introduce a significant amount of noise. Other sources of noise may also affect both still and motion picture images.

A number of methods of removing noise from images are known to the art. These can be divided into linear and non-linear filtering techniques. In a linear filtering technique a pixel in an image is replaced by a weighted sum of nearby pixels. An isolated pixel value generated by a noise event will be altered to a value that is nearer to that of the nearby pixels when this averaging operation is applied; hence, the noise is reduced. Unfortunately, this type of filter also blurs edges that are not generated by noise. Hence, overall picture quality is reduced as well.

Non-linear methods, in principle, can remove noise without significantly altering the overall picture quality. For example, U.S. Pat. No. 5,010,504 to Lee et al. describes a non-linear method based on the Singular Value Decomposition ("SVD") block transform of a difference image to provide an image having reduced noise. In the method taught by Lee et al., the image is first filtered using a conventional linear lowpass filter to generate a smoothed image. The smoothed image is subtracted from the original image to generate a difference image. The difference image is then processed to remove noise. The processed difference image is then added to the smoothed image to provide the final filtered image.

The difference image is processed by (1) dividing the difference image into blocks and (2) transforming each block via the SVD block transform. Let the original block be denoted by H:

$$H = UDV^T \qquad (1)$$

where U and V are orthogonal matrices and D is a diagonal matrix. The transform involves changing some of the values of D to obtain a new diagonal matrix D'. This new matrix is then substituted for D in Eq. (1) to generate the block to be used in the processed difference image.

In the system taught by Lee et al., the alterations made to D depend on a knowledge of the statistical properties of the noise. To obtain this knowledge, a region of the image that consists entirely of noise must be identified. The pixels of this region can then be used to generate the required statistical information. This process requires human intervention to identify the regions having only noise; hence, the method is poorly suited to automatic noise reduction of the type that would be useful in scanners or other image capture systems.

In addition, the method taught by Lee et al. assumes that the noise statistics in the regions of the image having non-noise information are the same as those in the region having only noise. This is not necessarily true for all capture devices. For example, vidicon cameras do not satisfy this constraint.

Prior art methods do not provide any automatic method for setting the parameters of the noise reduction algorithm absent some form of human intervention. As noted above, the method taught by Lee et al. requires the user to identify a region which is essentially all noise pixels so that the algorithm can compute the required statistics needed to alter the values in D. Methods in which a user views the filtered image to determine if it requires additional noise reduction or has suffered significant image degradation are also known to the art.

Broadly, it is an object of the invention to provide an improved image noise filter and an improved method of filtering noise from images.

It is another object of the invention to provide an image noise filter and filtering method that operates without human intervention.

It is another object of the invention to provide a image noise filter and filtering method that does not significantly degrade the image.

These and other objects of the invention will become apparent to those skilled in the art from the following detailed description of the invention and the accompanying drawings.

SUMMARY OF THE INVENTION

The present invention provides a method of filtering an image to remove noise without significantly degrading the image and without human intervention during the filtering process. Existing filtering methods degrade the image by blurring sharp lines and edges or require interaction with a human operator during the filtering process.

Briefly and in general terms, a noise filter according to the invention removes noise from an image by means of a Singular Value Decomposition ("SVD") transform according to an optimum value of a threshold parameter. The unfiltered image is provided in the form of a numerical array to a digital processing device such as a suitably programmed computer. The processing device divides the array into a set of non-overlapping subarrays which are called blocks. The SVD transform is repeatedly applied to one of these blocks, each time using a different value of a threshold parameter, to determine the degree of compressibility provided by each such value. The results of these transforms are compared and an optimal value of the threshold parameter is selected. The SVD transform is then applied to all the blocks using this optimum value. Finally the transformed blocks are recombined to provide the filtered image.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
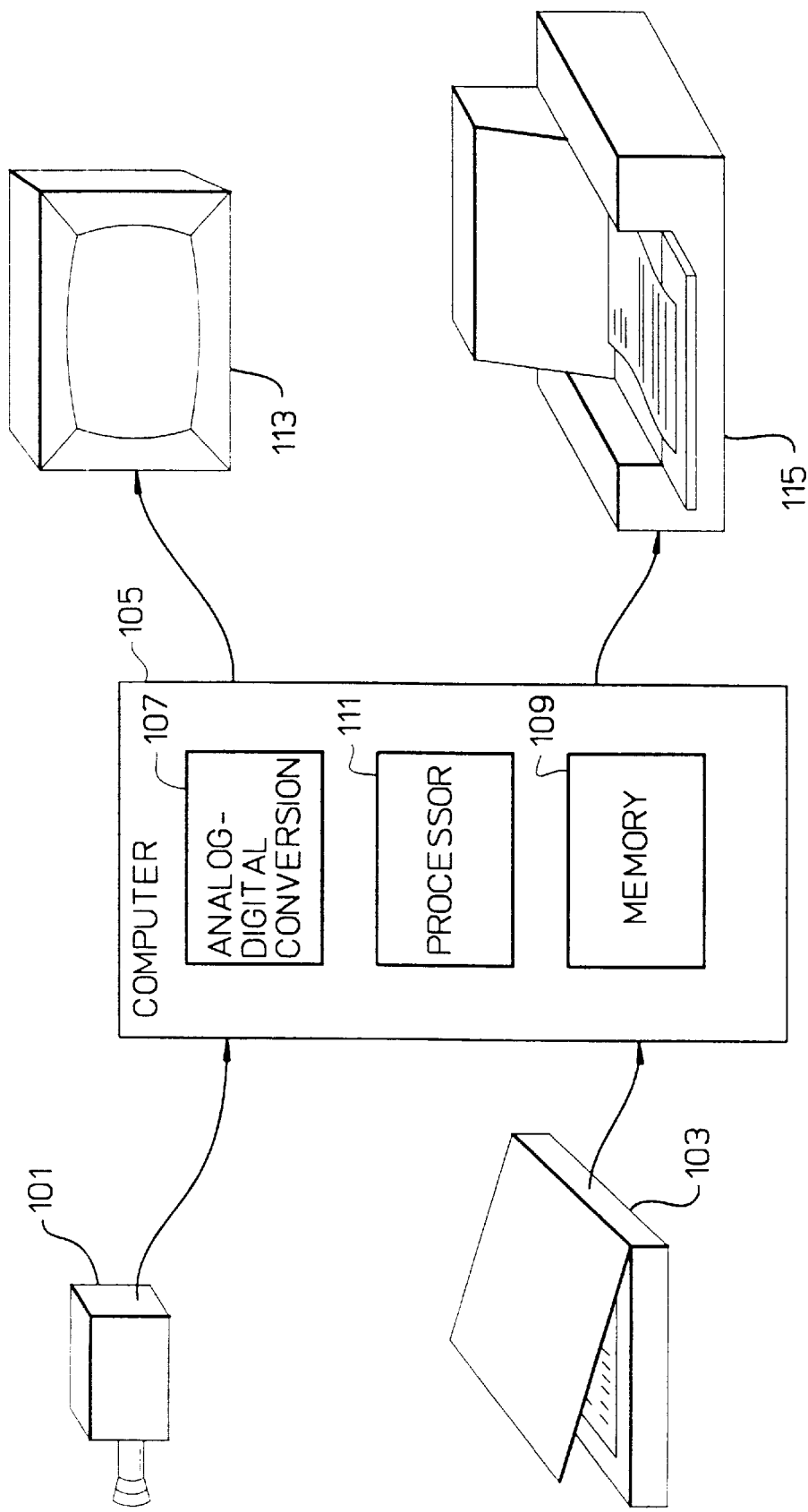
FIG. 1 is a block diagram of a system in which the invention may be practiced.

As shown in the drawings for purposes of illustration, the invention is embodied in a novel method of filtering noise from an image. Existing filtering methods tend to degrade the sharpness of the image or require human intervention during the filtering process. The method provided by the invention employs a Singular Value Decomposition ("SVD") transform first to determine an optimum value of a threshold parameter and then to filter the image using that optimum value.

Referring now to FIG. 1, an image is captured by a device such as a CCD television camera 101 or a scanner 103 and is provided in electronic form to a digital processor such as a computer 105 in which the image may be filtered according to the method of the invention. The computer 105 includes analog to digital conversion circuitry 107 for converting the image into digital form if necessary, a memory 109 (such as random access memory, a magnetic disk drive, or the like) for storing the image, and a processor 111. After the image has been filtered, it may be stored in the memory 109 or provided directly to an output device such as a television monitor 113 or a printer 115.

Figure 2:
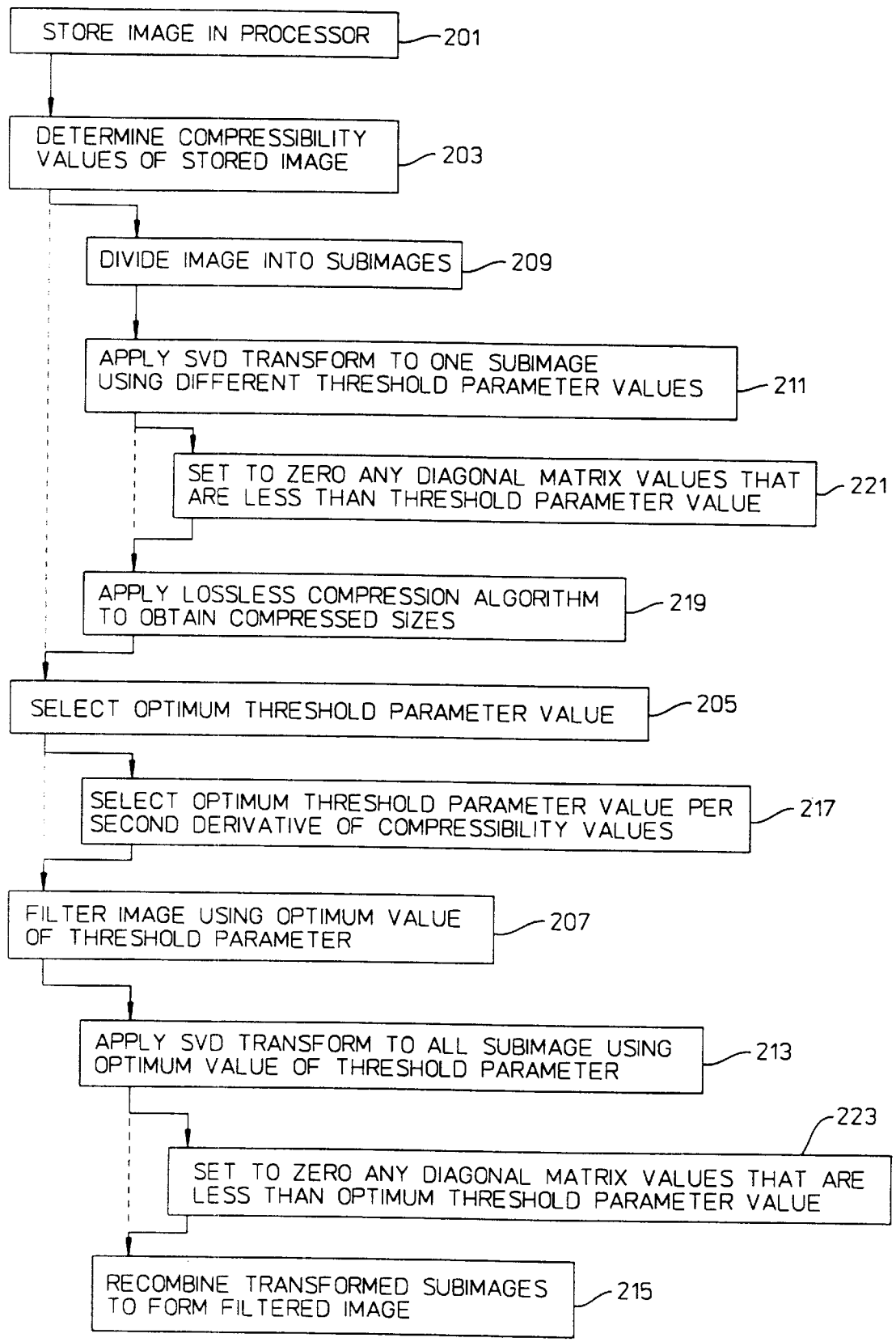
FIG. 2 is a flow chart depicting a preferred embodiment of the invention.

Filtering noise from an image according to the method of the invention will now be explained with reference to FIG. 2. The method includes the steps of (201) storing an image in the digital processor, (203) determining compressibility values of the stored image corresponding with various possible values of a threshold parameter, (205) selecting an optimum threshold parameter value according to the compressibility values determined in the preceding step, and (207) filtering the image using the selected optimum value of the threshold parameter.

The step of determining the compressibility values of the stored image preferably includes (209) dividing the image into a plurality of subimages (the subimages may also be referred to as "blocks") and (211) selecting one of the subimages and repeatedly applying an SVD transform to the selected subimage using a different threshold parameter value during each such application.

The step of filtering the image preferably includes (213) applying the Singular Value Decomposition transform to all of the subimages using the selected threshold parameter value and (215) recombining the transformed subimages to form the filtered image.

The step of selecting the optimum threshold parameter value preferably includes (217) selecting that threshold parameter value which corresponds with that compressibility value at which the second derivative of the compressibility value with respect to the log of the threshold parameter value is a maximum.

The step of determining the compressibility values of the image preferably further includes, after applying the SVD transform to the subimages, (219) using a lossless compressibility algorithm to determine the compressed sizes of the transforms of the selected subimage.

The SVD transforms of the selected subimage are preferably obtained by (221) setting to zero any values of the diagonal matrix of the transform that are less than the value of the threshold parameter being used for that transform, as will be explained in more detail presently. Similarly, obtaining the SVD transforms of all the subimages after the optimum value of the threshold parameter has been obtained is preferably accomplished by (223) setting to zero any values of the diagonal matrix that are less than the selected optimum value for the threshold parameter.

The mathematical basis for the invention will now be described. Initially, it will be noted that the invention is based in part on the observation that noise is difficult for most image compression systems to compress. An image compression algorithm is one that allows an image having M×N pixels with K bits per pixel to be stored in less than MNK bits. Image compression systems achieve compression because most images of interest to human observers contain a high degree of correlation among the pixels of the images. Because of this correlation, the actual number of values needed to represent the image is less than the number of bits in the pixel array in which the image is presented to an observer. The addition of noise pixels to the image reduces the degree of correlation among the image pixels, and hence, reduces the degree to which the image may be compressed. Conversely, if the added noise is removed from an image, the image will be capable of being compressed to a greater degree.

Consider a method that preferentially removes noise from an image and which depends on a parameter E which specifies the degree to which pixels are removed from the image. As noted above, the problem faced by noise reduction systems is determining the optimal value for E. The present invention determines the optimum value for E by observing the degree to which the filtered image can be compressed as a function of E. Consider any image compression algorithm. That algorithm operating on the image in question prior to noise reduction will generate a compressed image with some degree of compression depending on the algorithm and the image. When sufficient noise is removed from the image by applying the filter with a sufficiently large value of E, the degree of compression obtained will increase. At increasing values of E, the degree of compression may continue to increase further; however, this increase is accompanied, in general, by image degradation. The present invention operates by determining the value of the parameter at the "knee" of the curve so as to use the maximum value of E that does not destroy a significant number of non-noise pixels.

In a preferred embodiment of the present invention, a lossless compression algorithm such as the lossless JPEG algorithm is used; however, it will be apparent to those skilled in the art that a near-lossless algorithm such as the well known DCT compression algorithms may be used. In the case of a near-lossless algorithm, the maximum allowed mean pixel error or some other measure of the accuracy of the compression must also be specified.

The manner in which the present invention operates with respect to a noise filter based on the SVD transformation of blocks in the image will now be explained in detail. Consider an image I represented by a pixel array of dimension M×N. The pixel array is first broken into non-overlapping blocks of size m×n. The $i^{th}$ block will be denoted by $B_i$. For each block, the SVD transform of the block is determined. Hence, the $i^{th}$ block is decomposed as follows:

$$B_i = U_i D_i V_i^T \qquad (2)$$

where $U_i$ and $V_i$ are orthogonal matrices and $D_i$ is a diagonal matrix having diagonal elements $d_1, d_2, \ldots d_n$. Computer based methods for decomposing a matrix into its SVD representations are well known to those skilled in the art, and hence, will not be explained in detail here. Those not familiar with this process are referred to *Computational*

*Methods for Mathematical Computations* by G. E. Forsyth, et al., Prentice Hall, Inc., Englewood Cliffs, N.J., 1977. This reference provides a detailed computer program for computing an SVD transformation.

If $B_i$ contains only non-noise information, some of the diagonal elements of $D_i$ will be zero because of the correlations present in the image. The addition of noise converts these values to small non-zero values. The noise is removed by setting all diagonal elements whose absolute values are less than a threshold value E to zero thereby generating a new diagonal matrix $D_i'$. A filtered block $B'_i$ is then computed by using $D_i'$ in place of $D_i$ in Eq. (2) and $B_i$ is replaced by $B'_i$ in the image thereby generating a filtered image when all blocks have been so processed.

As noted above, the key issue in providing automatic processing of the blocks is determining the correct value for the threshold parameter E. In the preferred embodiment of the present invention, the value of E is assumed to be constant over all of the blocks in an image. For any given value of E, denoted by $E_k$, the image can be filtered, and the filtered image compressed. In the preferred embodiment of the present invention, the lossless JPEG compression algorithm is used. A lossless algorithm is preferred because such an algorithm avoids the distortions introduced by a near lossless algorithm. However, as noted above, the method of the present invention will function with any compression algorithm.

Figure 3:
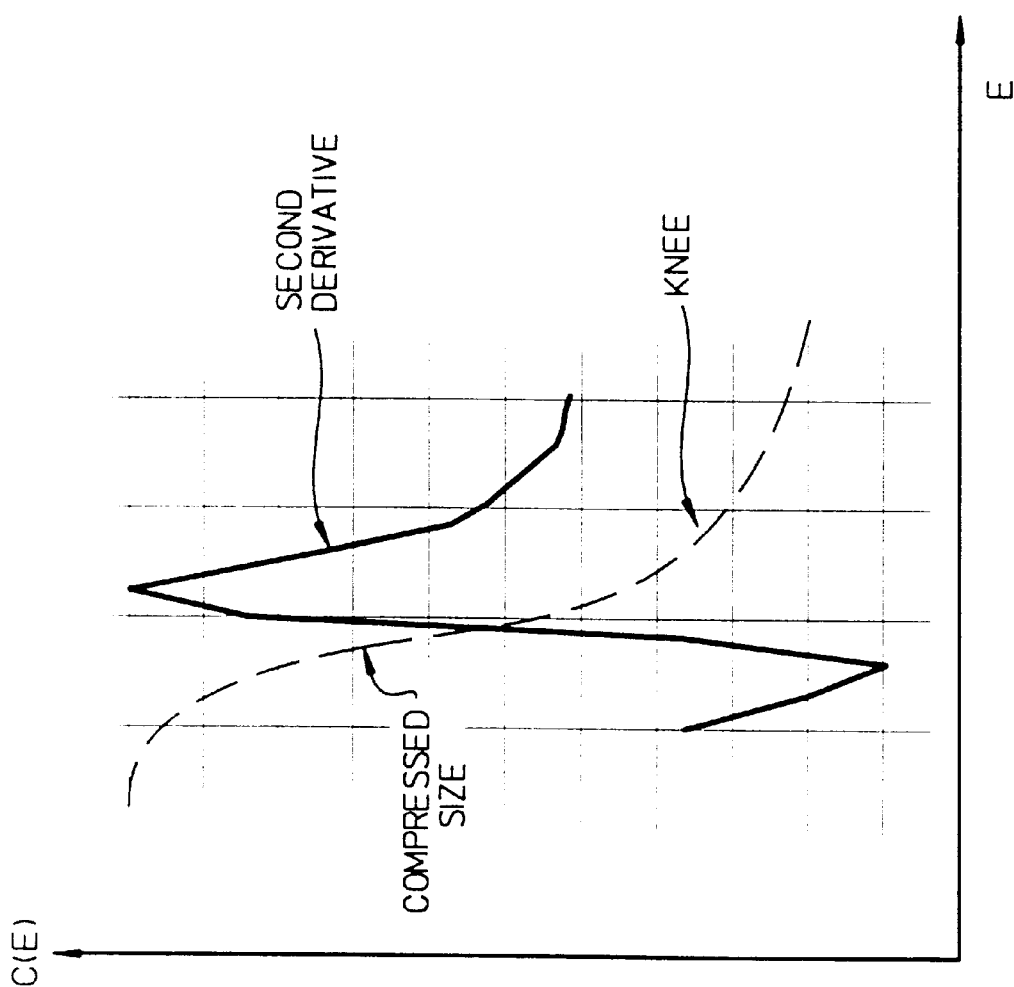
FIG. 3 is a graph of the compressibility of a test image as a function of the value of the threshold parameter.

The value of E is set by plotting the compressed size C(E) of the image as a function of E for a series of test values $E_k$. A typical example of such a plot is shown in FIG. 3. As can be seen from the plot, the degree of compression improves significantly as E is increased from 0. For large values of E, the improvements in the compression of the image obtained by increasing E become less significant. In the preferred embodiment of the present invention, the value of E used in filtering the images for noise reduction is set at the "knee" of the calibration curve. The knee can be determined by computing the second derivative of the curve, the knee coincides with the peak of the second derivative. While the preferred embodiment of the present invention uses the knee of the C(E) curve, other rules may also be used to select the point on the curve to use in selecting E.

In principle, the entire image may be processed as a single block. However, this substantially increases the processing time, since the computational complexity of the SVD transformation is of order $n^2$ for an n×n block.

While the above described procedure determined E from the compression behavior of a single image, it will be apparent to those skilled in the art that E can be set with reference to the compressibility of a set of images acquired with the same imaging instrument. This value of E would then be used to filter all images from that instrument. From time to time, the calibration of E should be tested and E updated if the noise behavior of the instrument has changed.

While the algorithms discussed above have been described in terms of their application to single images, it will be apparent to those skilled in the art that the present invention may be applied to the processing of video sequences to remove noise therefrom. The optimum value of E may be obtained on a frame by frame basis or by analyzing the compression behavior of a set of frames from the sequence.

While the preferred embodiment of the present invention utilizes the SVD transformation applied to blocks, it will be apparent to those skilled in the art from the above discussion that the method of determining the threshold taught herein may be applied to other noise filtering algorithms that depend on a threshold value. For example, isolated noise pixels may be identified searching for pixels above some level that do not have pixels above the level in question within a distance E of the pixel in question. The pixels so identified are then replaced by a weighted sum of the neighboring pixels. The parameter E can be set using the method of the present invention.

The present invention is preferably carried out on a general purpose data processing system. However, it will be apparent to those skilled in the art that special purpose computing hardware may also be utilized in those applications in which speed is particularly important.

Various modifications to the present invention will become apparent to those skilled in the art from the foregoing description and accompanying drawings. Accordingly, the present invention is to be limited solely by the scope of the following claims.

We claim:

1. A method of operating a digital processor to filter noise from an image, said method comprising:

filtering data for at least a portion of the image to produce a set of filtered data;

compressing the set of filtered data to produce a first set of compressed data;

compressing another set of data for the image, to produce a second set of compressed data; and analyzing relative compressibility of at least the first and second sets of compressed data, and selecting at least one threshold value in dependence upon relative compressibility;

filtering noise from the image using the at least one threshold value.

2. A method according to claim 1, wherein filtering at least a portion of the image includes:

applying a Singular Value Decomposition function to data representing the image, to yield three matrices, including two orthogonal matrices and a diagonal matrix;

setting to zero at least one value of the diagonal matrix to produce a modified diagonal matrix; and calculating filtered image data using the product of the two orthogonal matrices and the modified diagonal matrix.

3. A method according to claim 2, wherein setting to zero at least one value includes setting to zero all values of the diagonal matrix which fall below a threshold value.

4. A method according to claim 1, wherein:

filtering data for at least a portion of the image includes using a first threshold value; and compressing another set of data for the image includes
filtering data for at least a portion of the image using a second threshold value, different from the first threshold value, and
compressing filtered data obtained using the second threshold value, to produce the second set of compressed data.

5. A method according to claim 1, wherein the first and second sets of compressed data represent identical image regions.

6. A method according to claim 1, wherein:

analyzing compressibility includes determining the relative degree to which the same image data, filtered using different filtering thresholds, is compressed using a given image compression algorithm;

selecting at least one threshold includes selecting a single optimal threshold value; and filtering noise from the image includes processing the entire image with the digital processor using the single optimal threshold value to remove noise from the image.

7. A method according to claim 6, wherein the given image compression algorithm is a lossless image compression algorithm.

8. A method according to claim 1, further comprising:

filtering the same portion of the image multiple times, each time using a different filtering threshold value, to produce multiple filtered image examples;

comparing relative compressibility of multiple filtered image examples; and filtering the image using an optimal filtering threshold value selected in dependance upon relative compressibility.

9. A method according to claim 8, wherein selecting an optimal filtering threshold value includes identically selecting one of the different threshold values used to produce multiple filtered image examples.

10. A method according to claim 8, wherein selecting an optimal filtering threshold value includes determining a knee in relative compressibility of the filtered image examples, and selecting an optimal filtering threshold value corresponding to location of the knee.

11. A method according to claim 1, wherein filtering noise from the image includes:

applying a Singular Value Decomposition function to data representing the image, to yield three matrices, including two orthogonal matrices and a diagonal matrix;

setting to zero at least one value of the diagonal matrix to produce a modified diagonal matrix; and removing noise from the image by outputting the product of the two orthogonal matrices and the modified diagonal matrix.

12. A method according to claim 11, wherein setting to zero at least one value includes setting to zero all values of the diagonal matrix which fall below the optimal filtering threshold value.

13. A method of operating a digital processor to filter noise from an original image to generate an improved image, said method comprising:

(a) storing an image generated from said original image in said digital processor;

(b) determining the compressibility of said stored image;

(c) filtering said stored image using a filter that removes noise to generate a filtered image;

(d) determining the compressibility of said filtered image;

(e) determining said improved image from said filtered image if said determined compressibility of said filtered image is greater than said determined compressibility of said stored image.

14. A method according to claim 13 wherein determining the compressibility of said stored image comprises using a lossless compressibility algorithm to compress said stored image.

* * * * *